US010935261B2

(12) United States Patent
Meggers et al.

(10) Patent No.: US 10,935,261 B2
(45) Date of Patent: Mar. 2, 2021

(54) SYSTEM AND METHOD FOR DEHUMIDIFICATION OF AIR BY LIQUID DESICCANT ACROSS MEMBRANE

(71) Applicant: The Trustees of Princeton University, Princeton, NJ (US)

(72) Inventors: Forrest Meggers, Princeton, NJ (US); Jovan Pantelic, Princeton, NJ (US); Eric Teitelbaum, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 140 days.

(21) Appl. No.: 15/968,938

(22) Filed: May 2, 2018

(65) Prior Publication Data
US 2019/0338966 A1    Nov. 7, 2019

(51) Int. Cl.
F24F 3/14    (2006.01)

(52) U.S. Cl.
CPC ...... *F24F 3/1417* (2013.01); *F24F 2003/144* (2013.01); *F24F 2003/1435* (2013.01); *F24F 2003/1458* (2013.01)

(58) Field of Classification Search
CPC ............. F24F 3/1417; F24F 2003/1435; F24F 3/1411; B01D 53/263
See application file for complete search history.

(56) References Cited

U.S. PATENT DOCUMENTS

| | | | | |
|---|---|---|---|---|
| 5,364,455 | A  * | 11/1994 | Komarneni | B01D 53/261 95/117 |
| 6,684,649 | B1* | 2/2004 | Thompson | B01D 53/263 62/272 |
| 2008/0242538 | A1* | 10/2008 | Grieve | A43B 1/0045 502/405 |
| 2014/0260369 | A1* | 9/2014 | LePoudre | F24F 5/0035 62/91 |
| 2016/0138817 | A1* | 5/2016 | Hamlin | B01D 53/263 95/52 |

OTHER PUBLICATIONS

Stefano Bergero, Anna Chiari: "Experimental and theoretical analysis of air humidification/dehumidification processes using hydrophobic capillary contactors", Applied Thermal Engineering, vol. 21, pp. 1119-1135, 2001.
Stefano Bergero, Anna Chiari: "Performance analysis of a liquid desiccant and membrane contactor hybrid air-conditioning system", Energy and Buildings, vol. 4, pp. 1976-1986, 2010.
Rajat Subhra Das, Sanjeev Jain: "Experimental performance of indirect air-liquid membrane contactors for liquid desiccant cooling systems", Energy, vol. 57, pp. 319-325, 2013.
(Continued)

*Primary Examiner* — Elizabeth J Martin
(74) *Attorney, Agent, or Firm* — Meagher Emanuel Laks Goldberg & Liao, LLP (57) ABSTRACT

A method and system for mass and heat exchange, where water is preferentially absorbed by a non-toxic, non-corrosive liquid desiccant after passing through a hydrophilic, non-porous membrane. Optionally, mixing stages are provided to reduce the surface concentration of water at the desiccant-membrane interface.

20 Claims, 8 Drawing Sheets

(56) References Cited

OTHER PUBLICATIONS

Akira Ito: "Dehumidification of air by a hygroscopic liquid membrane supported on surface of a hydrophobic microporous membrane", Journal of Membrane Science, vol. 175, pp. 35-42, 2000.
Li-Zhi Zhang: "Fabrication of a lithium chloride solution based composite supported liquid membrane and its moisture permeation analysis", Journal of Membrane Science, vol. 276, pp. 91-100, 2006.
K. Kneifel, S. Nowak, W. Albrecht, R. Hilke, R. Just, K.-V. Peinemann: "Hollow fiber membrane contactor for air humidity control: Modules and membranes", Journal of Membrane Science, vol. 276, pp. 241-251, 2006.
Saul Scovazzo, Jedrick Burgos, Alex Hoehn, Paul Todd: "Hydrophilic membrane-based humidity control", Journal of Membrane Science, vol. 149, pp. 69-81, 1998.
Saul Scovazzo, Alex Hoehn, Paul Todd: "Membrane porosity and hydrophilic membrane-based dehumidification performance", Journal of Membrane Science, vol. 167, pp. 217-225, 2000.
Li-Zhi Zhang, Yuan-Yuan Wang, Cai-Ling Wang, Hui Xiang: "Synthesis and characterization of a PVA/LiCl blend membrane for air dehumidification", Journal of Membrane Science, vol. 308, pp. 198-206, 2008.
Minlin Yang, Si-Min Huang, Xiaoxi Yang: "Experimental investigations of a quasi-counter flow parallel-plate membrane contactor used for air humidification", Energy and Buildings, vol. 80, pp. 640-644, 2014.

\* cited by examiner

SYSTEM AND METHOD FOR DEHUMIDIFICATION OF AIR BY LIQUID DESICCANT ACROSS MEMBRANE

BACKGROUND OF THE INVENTION

Humidity in indoor environments has an impact on thermal comfort, productivity and occupant health, hence controlling humidity in the indoor environment is very important. Apart from regions with desert climates, annual latent loads are several times greater than sensible loads for HVAC. Due to these high latent loads, effective and efficient dehumidification of ventilation air is very important from an energy perspective. The most frequently used method for dehumidification is oncoil condensation that wastes cooling potential and often requires reheating the air after cooling below the dew point to mechanically remove moisture. Coupling cooling coils with heat pipes has made some improvements in efficiency. Besides on coil condensation, solid desiccant wheels offer more efficient dehumidification where the electrical energy used in conventional chillers to generate subcooling for condensation can be replaced with heat or recovered dry exhaust air to regenerate a solid desiccant wheel that then absorbs moisture from incoming air. Among commercially available systems, liquid desiccants that must be pumped into and out of air streams are available, but face challenges making them less common than solid desiccant wheel systems.

Also salient is the potential for liquid desiccants to allow decentralized dehumidification in buildings. Liquid desiccants can be divided generally in two categories: halide salts and glycols. Halide salts are very strong desiccants, but are also corrosive to most metals hence titanium parts have to be used. This, coupled with the cost of halide salts, represent limitations for wider applications. Glycols are not corrosive, but are highly volatile, hence systems using them require constant refilling, which is very expensive and present limitation in applications. Current modes of humidity absorber configurations involve direct contact of liquid desiccant and the air supplied to the indoor environment, which can cause carryover of liquid droplets into the airstream. These may be harmful to occupant health, building structure and materials. Carryover problem is another limitation of early liquid desiccant systems.

Membrane based liquid desiccant systems were then developed to physically segregate the liquid and gas phase to overcome carryover problems. Membranes introduce resistance to water vapor transport from air liquid desiccant, hence current research is directed towards developing membranes that minimize the resistance to mass transfer while preventing droplet carryover. Effectiveness of two types of membranes have been investigated: hydrophobic microporous membranes (Bergero & Chiari, 2001, 2010; Das & Jain, 2013; Ito, 2000; Zhang, 2006) and hydrophilic microporous membranes (Kneifel et al., 2006; Scovazzo, Burgos, Hoehn, & Todd, 1998; Scovazzo, Hoehn, & Todd, 2000; Zhang, Wang, Wang, & Xiang, 2008). Microporous membranes do not provide complete separation of desiccant and air fluids if the partial pressure difference between the two streams is not highly controlled hence some crossover is still possible (Yang et al., 2014). In order to fully physically separate phases, a nonporous membrane must be used.

When the temperature of the liquid desiccant is increased, the equilibrium vapor pressure is typically increased; hence their ability to absorb water vapor from the airstream is reduced. This has important consequences for desiccant dehumidification, since in order to regenerate liquid desiccant additional power is usually used to increase liquid desiccant temperature so that it can desorb water.

Thus, there currently exists a need for a dehumidification system that utilizes a non-toxic, non-corrosive liquid desiccant that substantially retains its ability to absorb water vapor when heated.

BRIEF DESCRIPTION OF THE INVENTION

Disclosed is a mass and heat exchange system which comprises an absorber unit. The absorber unit comprises a liquid desiccant that is pumped through at least one liquid channel defined by a hydrophilic, non-porous membrane, where a gas is in contact with at least a portion of outer surface, and where the membrane has an interaction potential with water that is less than the desiccant interaction potential with water. Various refinements include defining lengths, and ratios between the various features, specific desiccant functionality or structure, the use of mixing or regeneration stages to aid in the mass and heat transfer process, the use of positive displacement pumps, and the use of temperature or relative humidity sensors.

Also disclosed is a method for mass and heat exchange, which involves flowing a liquid desiccant through at least one liquid channel defined by a hydrophilic, non-porous membrane, where a gas is in contact with at least a portion of the outer surface, and where the membrane has an interaction potential with water that is less than the desiccant interaction potential with water. Various refinements include defining desirable flow characteristics, regenerating the desiccant, utilizing mixing stages to avoid saturation, and reducing the partial pressure of water vapor in the air to benefit the mass and heat transfer rates.

BRIEF DESCRIPTION OF DRAWINGS

The invention will be described hereinafter with reference to non-limitative examples, which are provided for explanatory, non-limitative purposes in the accompanying drawings. These drawings illustrate different aspects and embodiments of this invention and, where appropriate, the structures, components, materials and/or similar elements are indicated in the different figures with similar reference numbers.

DETAILED DESCRIPTION OF THE INVENTION

While the invention is susceptible to various modifications and alternative constructions, some of the illustrated embodiments are shown in the drawings and will be described below in detail.

It must be understood, however, that there is no intention to limit the invention to the specific illustrated embodiments, but, on the contrary, the invention intends to cover all the modifications, alternative constructions and equivalents that fall within the scope of the invention as defined in the claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

The singular forms "a", "an", and "the" include plural referents unless the context clearly dictates otherwise.

The use of "such as", "etc.", "or" indicates non-exclusive alternatives without limitations, unless otherwise indicated.

The use of "includes" means "includes, but is not limited to", unless otherwise indicated.

"Interaction potential" as used herein is defined as the strength of the interaction between water and either the membrane or the desiccant and also contains a component related with the energy barrier associated with coming out of the potential well.

A mass and heat exchanger is disclosed that allows moisture to pass from air into a liquid desiccant while avoiding problems with corrosion, carryover and saturation. The viscosity of the desiccant is not particularly limited. Ideal liquid desiccants have low viscosity for pumping, with a high capacity for water.

In preferred embodiments, the liquid desiccant has a viscosity at 25 degrees C. of less than 0.04 Pascal-seconds (Pa-s). In one embodiment, the viscosity is between 0.030 and 0.032 Pa-s. In other embodiments, the viscosity is reduced to a level that minimizes the energy required for pumping the desiccant, while preventing the desiccant from becoming too volatile.

Further, in preferred embodiments the liquid desiccant exhibits an equilibrium capacity of greater than 0 but less than 10 wt % (10 g of $H_2O$ absorbed per 100 grams of desiccant) between 20 and 80% relative humidity (RH). In more preferred embodiments, the equilibrium capacity is greater than 0 but less than 5 wt %. In still more preferred embodiments, the equilibrium capacity is between and including 1 and 3 wt %.

In general, alkoxylated siloxanes are preferred. Alkoxylated siloxanes are non-toxic, have low volatility, and are generally compatible with most common materials of construction. In a preferred embodiment, at least 50 wt % of the liquid desiccant comprises an alkoxylated siloxane. In more preferred embodiments, at least 70 wt % of the liquid desiccant comprises an alkoxylated siloxane. In still more preferred embodiments, the remainder of the liquid desiccant comprises at least one compound with multiple hydroxyl functional groups, which is referred to as a polyol. In an even more preferred embodiment, the liquid desiccant comprises between 70 and 90 wt % of at least one alkoxylated siloxane, and between 10 and 30 wt % polyol.

Figure 1:
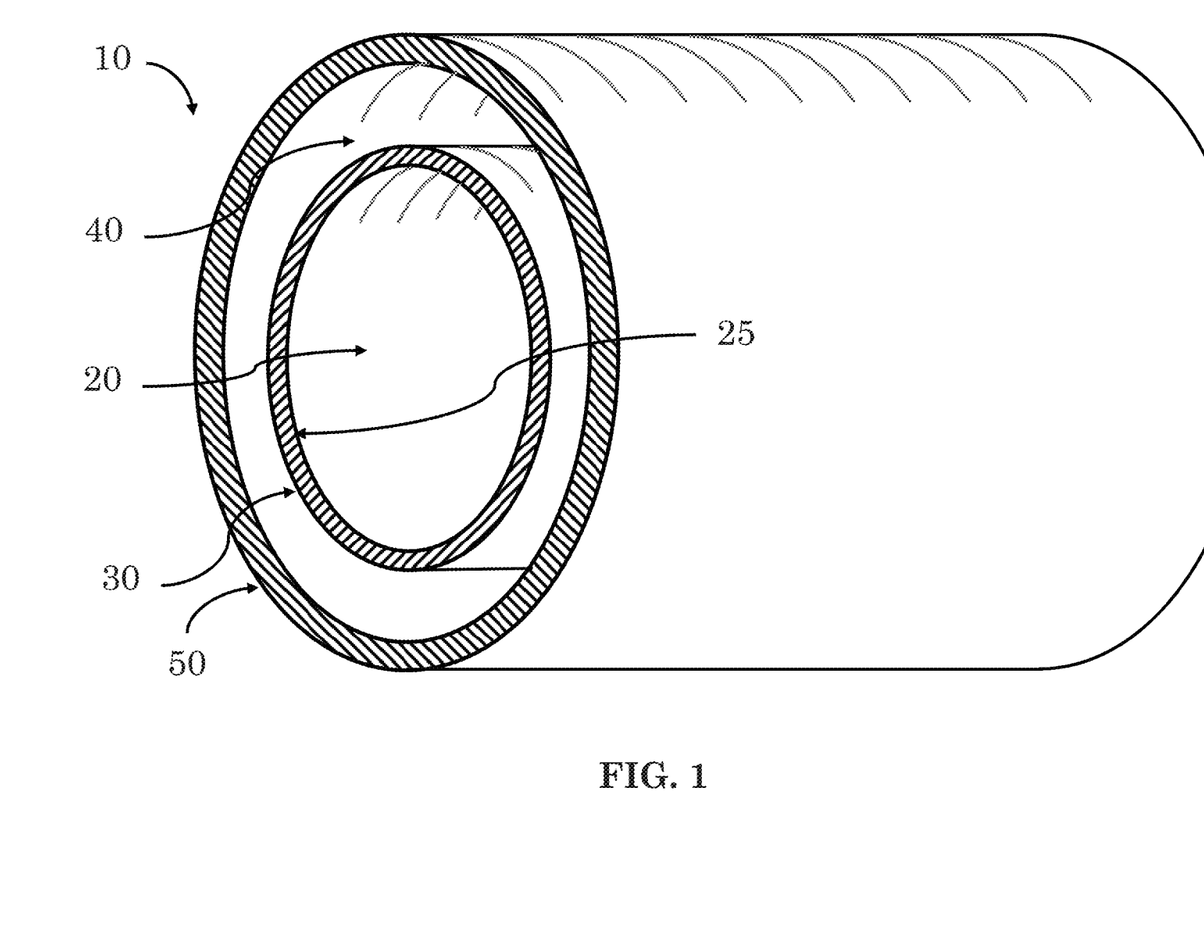
FIG. 1 illustrates one embodiment of a shell-and-tube arrangement of the present invention.

Referring to FIG. 1, one embodiment of an absorber unit (10) of a mass and heat exchange system is shown at a slight angle. This particular embodiment can be envisioned as two concentric cylinders, the inner cylinder being the membrane through which the liquid desiccant flows, and the outer cylinder through which the air flows. In particular, the absorber unit (10) in this embodiment first comprises a liquid channel (20) which is defined by a hydrophilic, non-porous membrane (30). A liquid desiccant will flow through the liquid channel (20). Surrounding the membrane is a gas channel (40), which in this embodiment, is defined an outer shell (50).

The membrane (30) is nonporous and hydrophilic. In preferred embodiments, these membranes are comprised of a thermoplastic elastomer, such as block copolymers. In more preferred embodiments, the membranes are comprised of a polyether block amide (PEBA). In preferred embodiments, the membrane has an interaction potential with water that is less than the desiccant's interaction potential with water. Thus, in a preferred embodiment of the absorber unit, water vapor energetically favors the membrane over air, and energetically favors the desiccant over the membrane.

Figure 8:
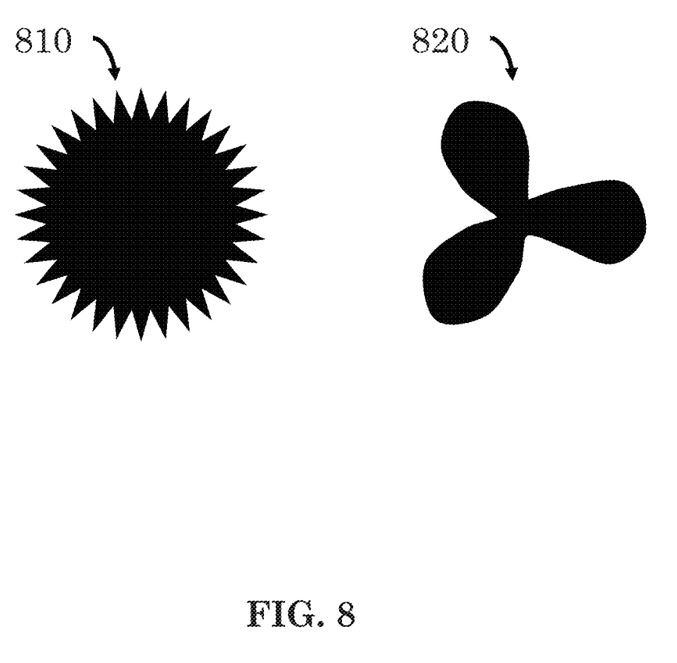
FIG. 8 depicts non-limiting examples of non-circular cross-sections of liquid channels.

In preferred embodiments, the interior surface area to volume ratio of the membrane will be large. Thus, one preferred embodiment utilizes a design wherein the outer diameter of membrane (30) will be relatively small. For example, in one preferred embodiment, the outer diameter is less than 5 millimeters. In a more preferred embodiment, the outer diameter is less than 3 millimeters. In a still more preferred embodiment, the outer diameter is less than 2 millimeters. Further, the cross-section is not limited to circular cross-sections. Other preferred embodiments utilize non-circular cross-sections. Referring to FIG. 8, for example, a tube may be printed or extruded that utilizes a multi-point star (810) cross-section, or a multi-lobe (820) cross-section. In addition, those cross sections may rotate or be modified over the length of the liquid channel. For example, cross section 820 may be used for a first portion of a liquid channel, then the cross section for the subsequent section may be rotated, for example by about 5 degrees, initiating both axial and radial flow.

It is envisioned that the outer shell (50) will be comprised of almost any material compatible with the environment, including but not limited to clear and flexible tubing, a rigid case, or a metal case.

Figure 2:
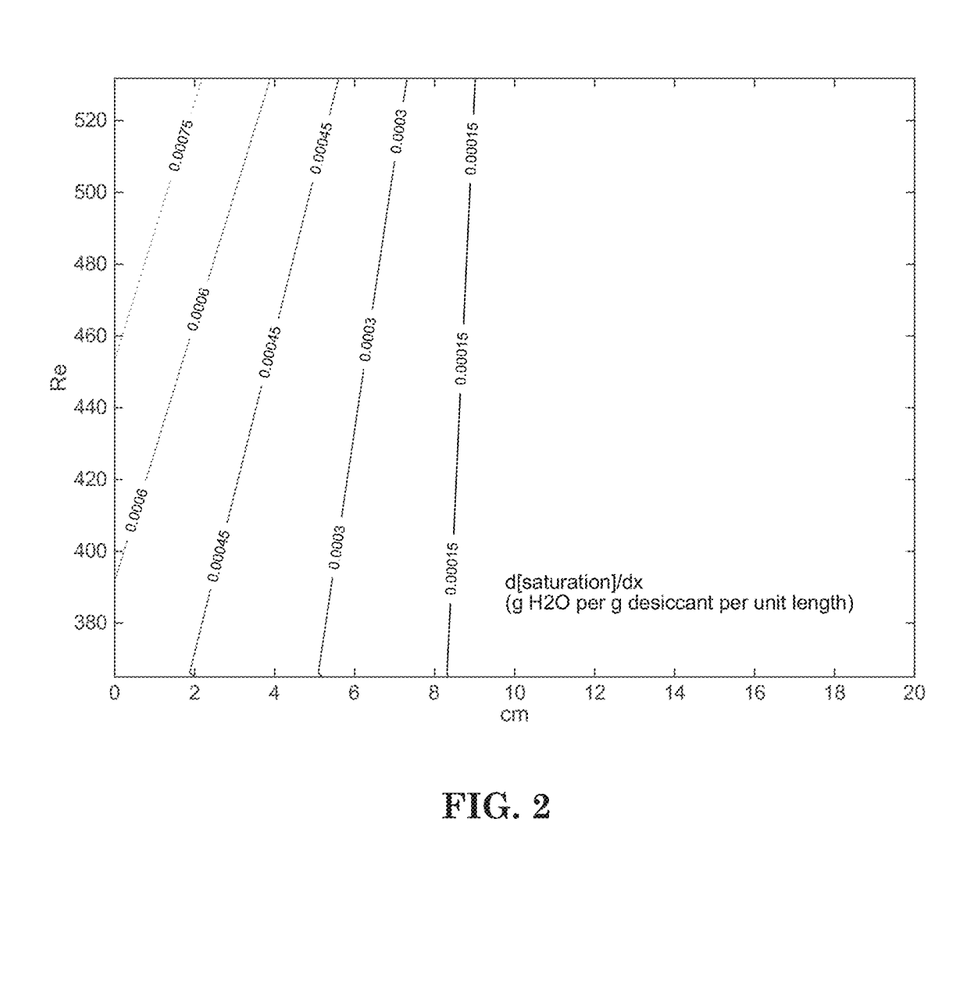
FIG. 2 depicts a saturation profile of liquid desiccant within the liquid channels.
Figure 3:
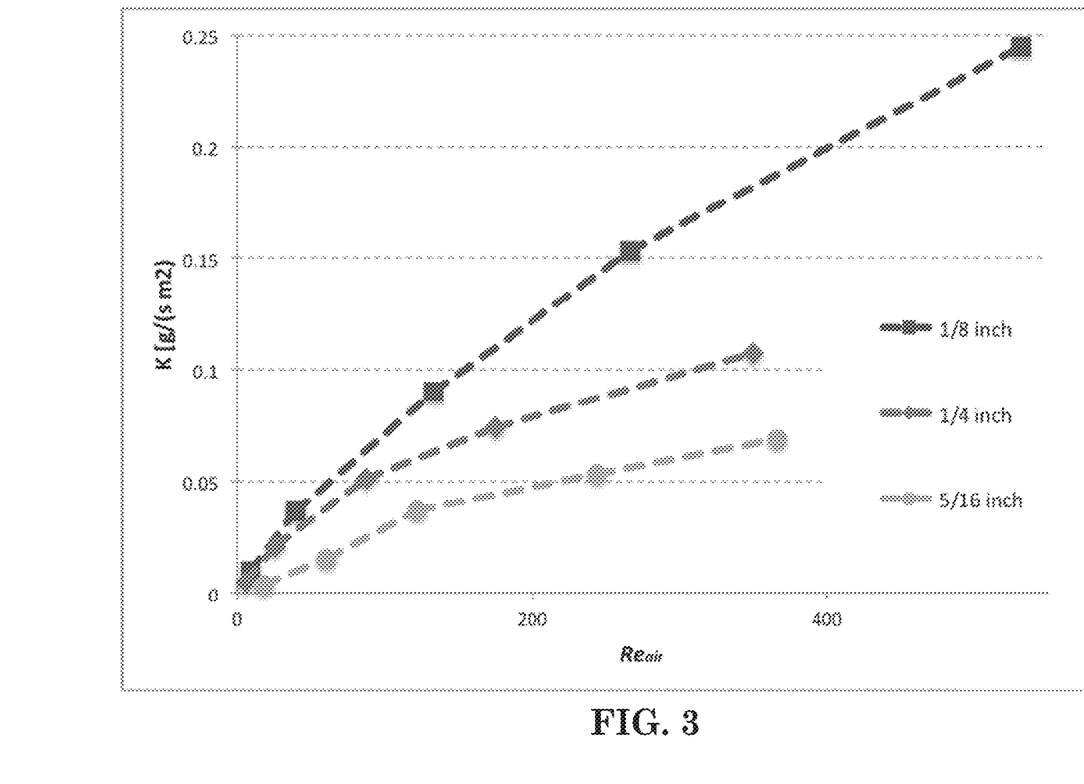
FIG. 3 is a graph depicting the relationship between Reynolds number and mass transfer rates per unit area for one embodiment of the present invention.

In embodiments having a single liquid channel in a membrane (30) and a single gas channel surrounding membrane (30) and inside the shell (50)—that is, in a configuration similar to that shown in FIG. 1—the highest vapor removal was achieved by decreasing the shell inner diameter and increasing the airflow rate. In one example, a 1 millimeter nominal ID membrane tube formed a single liquid channel, and tubes with a variety of inner diameters (in this non-limiting example, nominal ⅛ inch, ¼ inch, and 5/16 inch Tygon® E-1000 non-DEHP laboratory tubing was used) were utilized as the outer shell. To normalize airflow rates across different volumetric flow rates and outer tube diameters, the Reynolds number (Re) was calculated using a hydraulic diameter of $D_H = D_o - D_i$, the kinematic viscosity for air, and the average cross-sectional air velocity given by the volumetric flow rate divided by the cross sectional area. FIG. 2 illustrates that in this example, for the same airflow rate, mass flux is higher for the smaller shell. And as seen in FIG. 3, the highest mass transfer rates were seen when the countercurrent flowing air was passing through the smallest diameter tubing (⅛ inch), and that mass flux increases with increased Re. This indicates that increase of contact time between the dehumidifying surface and humid air due to the lower velocity inside the shell has a smaller impact than mass transfer coefficient increase with Re increase.

Thus, in preferred embodiments, the absorber unit can be configured to maximize the Reynolds number while maintaining laminar flow within the absorber unit, and especially in the volume of space surrounding each membrane (30). In preferred embodiments, the Reynolds number is greater than 500. In more preferred embodiments, the Reynolds number is between 500 and 2000. In some configurations, this may be controlled by the controlling the inner diameter of outer shell (50). In other configurations, it may require controlling the packing of the various membranes (30) within the outer shell (50). In a preferred embodiment, the inner diameter of outer shell (50), or whatever is used to define gas channel (40), is between 2 and 15 times the inner diameter of the membrane (30), or whatever is used to define liquid channel (20), inclusive.

The length of the liquid channel is envisioned to be practically any length. Especially in embodiments where the bulk diffusion is not limiting the uptake, a long, relatively thin membrane is preferred. Especially in those embodiments, the length is configured to be between 10 and 100,000 times an inner diameter of the liquid channel, inclusive. However, if that rate of bulk diffusion is limiting, FIG. 2 provides insight into how a system could be more optimally scaled up for a room, given a known moisture removal criteria that needs to be met. For instance, as the most active dehumidification, a reactor vessel that has short exchange lengths in between a mixing region would exhibit a higher overall uptake than a single, continuous straight reactor of the same length. This is because the diffusion limited regime is approached quickly (in FIG. 2, this is shown as occurring within 10 cm). As the outer surface of the desiccant (20), which in FIG. 1 is located at the inner surface of membrane (30), becomes more concentrated, absorption rates slow as the system enters a diffusion-limited regime. That is because water mass transport from the air onto the surface of the liquid desiccant is very fast compared to the diffusion from the surface of the desiccant down into the bulk desiccant material, so once the desiccant free surface is saturated the dehumidification rate slows down considerably. Note that while the particular desiccant used in this example enters a diffusion limited regime after approximately 10 cm, the surface absorption, its subsequent diffusion into the bulk, and the surface area to volume ratio determines that distance, so other desiccants, including those that have higher or lower viscosity, may have a different window for entering a diffusion limited regime. Thus, in a preferred embodiment, the length of a liquid channel is less than 200% of the non-diffusion limited regime or the length of the channel before it enters a diffusion-limited regime. In a more preferred embodiment, the length of the liquid channel is within 50% to 150% of the length of the non-diffusion limited regime. And in a more preferred embodiment, the length of the liquid channel is within 75% to 125% of the length of the non-diffusion limited regime.

Figure 4:
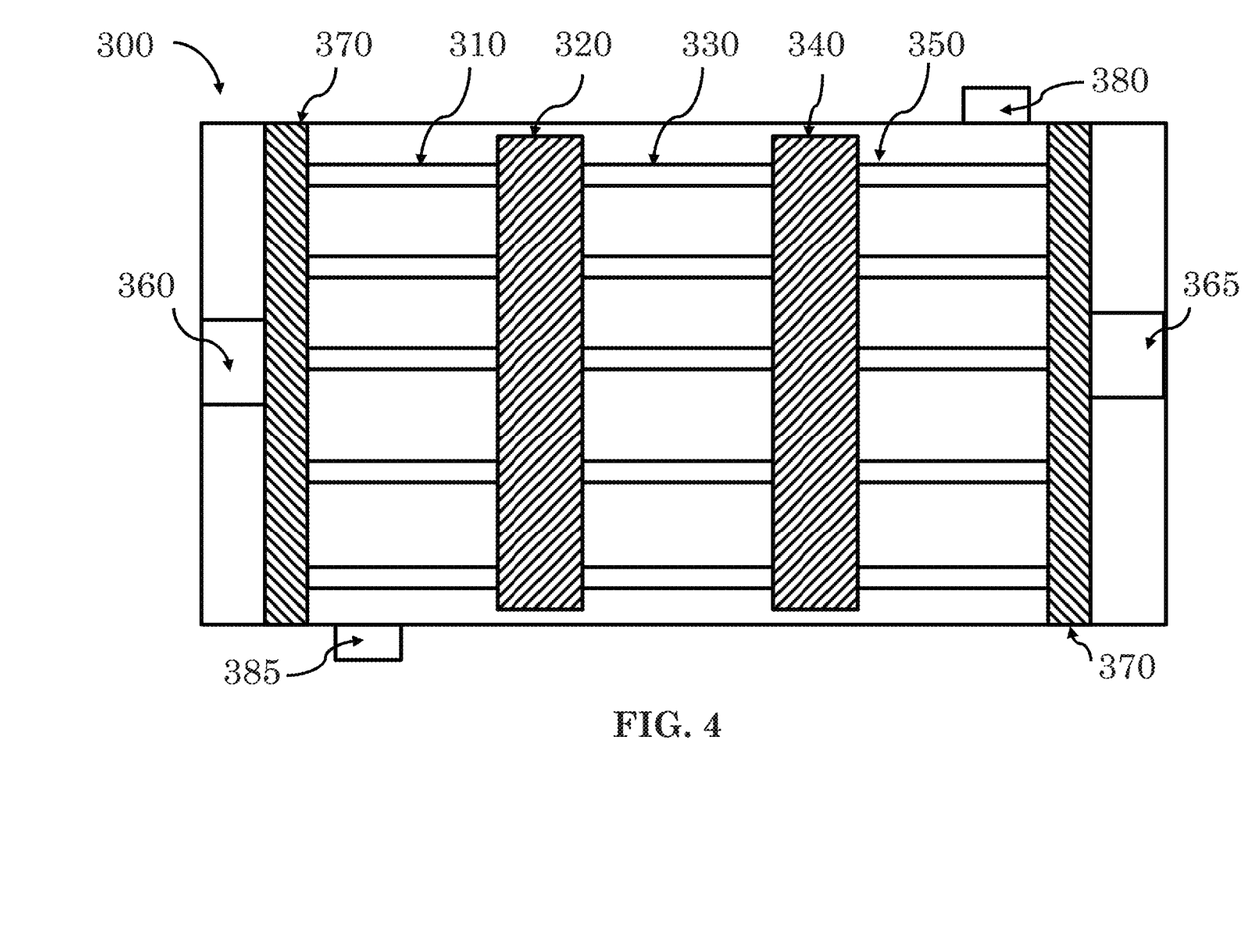
FIGS. 4 and 5 illustrate embodiments of multi-channel absorbing units.

FIG. 4 illustrates an alternative, non-limiting example of an absorber unit (300). In this example, using an appropriate pump (not shown), desiccant is pumped in to the absorber unit (300) through an input port (360). The input port (360) is connected to a first manifold (370), which distributes the incoming desiccant to a plurality of first liquid channels (310), each of which are defined by a membrane. Those first liquid channels (310) are then connected to inputs on a first mixing stage comprising a mixing chamber (320). The first mixing stage comprising a mixing chamber (320) then outputs the mixed desiccant into a plurality of second liquid channels (330), each of which are defined by a membrane. The mixing stage comprising a mixing chamber (320) is intended to simply reduce or eliminate the high surface concentration of water at the desiccant-membrane interface (25) that existed in the channels that feed the mixing stage (in this case, first liquid channels (310)), in order to maximize the mass transfer in the next set of channels (in this case, second liquid channels (330)). Thus, this can be an open volume of space, a volume of space with baffles or other means of generating some additional mixing, or even a propeller mixer or the like. In addition, this stage may also include a pump, depending on the flow characteristics of the system.

The process is repeated, wherein the second liquid channels (330) are then connected to inputs on a second mixing stage comprising a mixing chamber (340), and after mixing, the desiccant is then output into a plurality of third liquid channels (350), each of which are defined by a membrane. In this example, the third liquid channels (350) are then connected to a second manifold (370), which redirects the desiccant flowing through the third liquid channels (350) into an output port (365) of the absorber unit. Channels and mixing stages can be repeated in this fashion to optimize the utilization of the bulk desiccant. Optimization will balance maximizing the removal of water and maintaining optimal kinetics. In addition, air is passed through the absorber unit in a counter-current fashion, flowing from an air input port (380) to an air output port (385).

Figure 5:
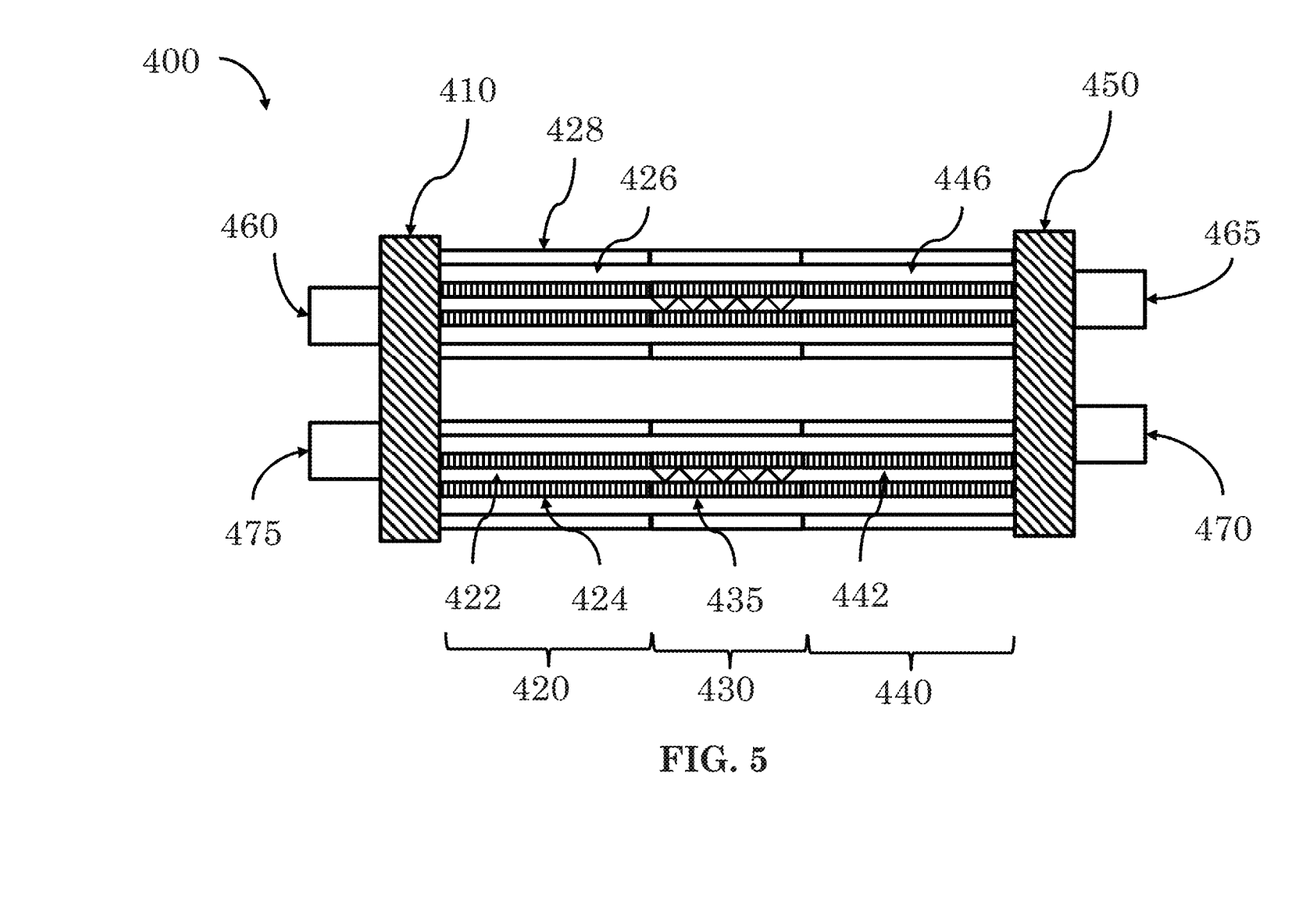

FIG. 5 illustrates another non-limiting example of an absorber unit (400). In this example, absorber unit (400) utilizes a plurality of individual shell-and-tube exchangers. Liquid desiccant enters the absorber unit (400) through input port (460). The desiccant pass into a first manifold (410) and then into a first series of channels (420). The first series of channels (420) comprises liquid channels (422), each defined by a membrane (424), as well as gas channels (426) defined by an outer shell (428). The liquid channels (422) are then fed into a mixing stage (430). In this embodiment, the mixing stage comprises a static mixer (also called a pipe mixer) element (435). The concept of static mixing is well known in the industry. Here, a static mixer would be incorporated into the absorber unit, typically either by connecting a liquid channel to a pre-fabricated static mixer element, or by printing or extruding a liquid channel having at least one section where the internal configuration of that section allows it to function as a mixer element portion. It should also be noted that any portion of the liquid channel, including the entire length, could be configured as a static mixer. The mixed desiccant is then fed into the liquid channels (442) of a second series of channels (440). From there, the desiccant flows into a second manifold (450), and out through an output port (465). In this example, air is run countercurrent, from a first port (470) to a second port (475). Manifolds (410, 450) are designed to flow the air to the gas channels, and the desiccant to the liquid channels. The mixing chamber (430) is similarly designed to keep the air from the gas channels separate from the desiccant in the liquid channels.

The absorbing units discussed above, and illustrated in FIGS. 4 and 5, can also be used as regeneration, or desorber, units, but running relatively saturated, or "wet" desiccant, through the liquid channels, and low vapor pressure air through the gas channels.

Figure 6:
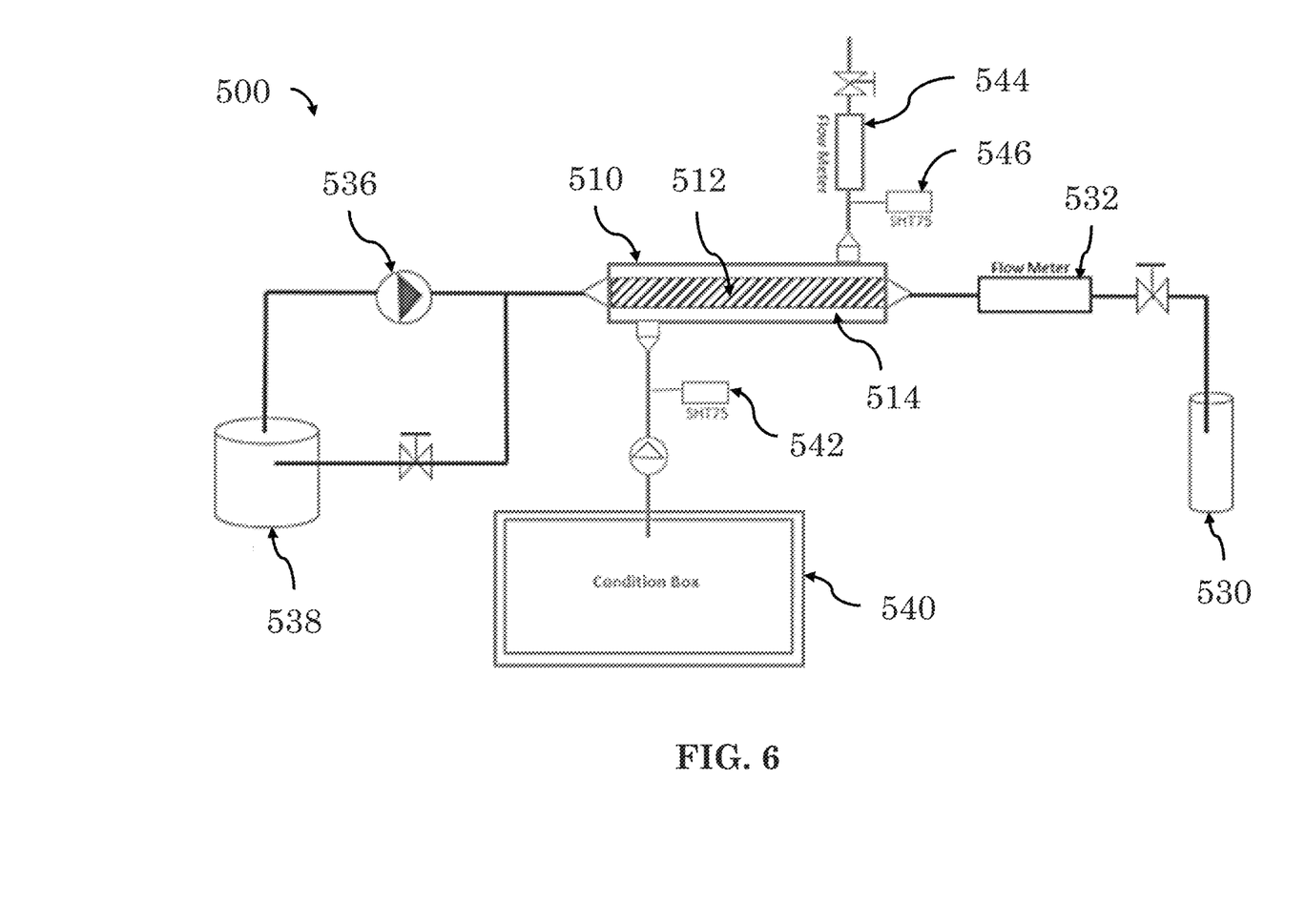
FIGS. 6 and 7 illustrate embodiments of a mass and heat transfer system.

FIG. 6 depicts one non-limiting example of a simple configuration of a mass and heat exchange system (500). In FIG. 6, the absorber unit (510) has a tube in a shell structure. The liquid channel (512) is defined by the inner tube. In this example, the liquid channel is a PEBAX® polyether block amide membrane tube, from Arkema. This tube has an outer diameter of 1.5 mm. The outer shell consists of a Tygon® E-1000 non-DEHP laboratory tubing from Saint-Gobain Performance Plastics, having a nominal diameter of ⅛ inch. This shell defines the gas channel (514) through which air is pumped. The maximum length of the absorber unit (510) was 67.5 cm. The system may utilizes a variety of temperature and relative humidity sensors (542, 546) in addition to flowmeters (544), any or all of which can be positioned upstream or downstream from the gas channels in the absorbing unit (510)

"Dry" desiccant—desiccant with substantially very little water absorbed on the surface or in the bulk—is supplied to the liquid channel (512) from a first desiccant reservoir (538), via a peristaltic pump (536). A peristaltic pump is utilized in this example, although in practice, other positive displacement pumps may also be utilized. After passing through the conditioning unit (510), the desiccant, now "wet", passes through a flow meter (532) and into a second reservoir (530).

From the second reservoir, the "wet" desiccant may be regenerated into "dry" desiccant in a variety of ways known to those skilled in the art. As one non-limiting example, heat is provided in the regeneration unit, configured to provide a large liquid desiccant surface, the heat forcing water to desorb from the liquid desiccant.

The regenerated liquid desiccant can be handled in various ways. It is envisioned that the liquid could simply be reintroduced to absorbing unit directly, or may be added to a reservoir for use as the absorbing unit requires it.

In the example system, optional condition box (540) was used to provide controlled conditions through the absorber unit (510) for various experiments. Condition box (540) can be made of almost any dimensions, although the present example utilized dimensions of 1 m×1 m×1 m. One side of the box was made of acrylic and the rest was made out of sealed plywood. Air temperature was regulated with an electrical heater placed inside the box and relative humidity was regulated with an ultrasonic humidifier with a built in water purifier and control sensor. A fan was used to mix the air in the box. The ultrasonic humidifier had cyclical operation so output RH cycled by 5%. The temperature in the box reached steady state within an hour, after which experiments could be run.

The air flowed from the condition box (540) was pumped past a temperature and RH sensor (542), and into the gas channel of absorber unit (510). The air then ran counter to the desiccant flow, and out of the absorber unit (510), where it passed by another temperature and RH sensor (546) and through a flow meter (544). In a more typical operational system, the condition box would not be present, and ambient air would flow through the system in a similar fashion.

Figure 7:
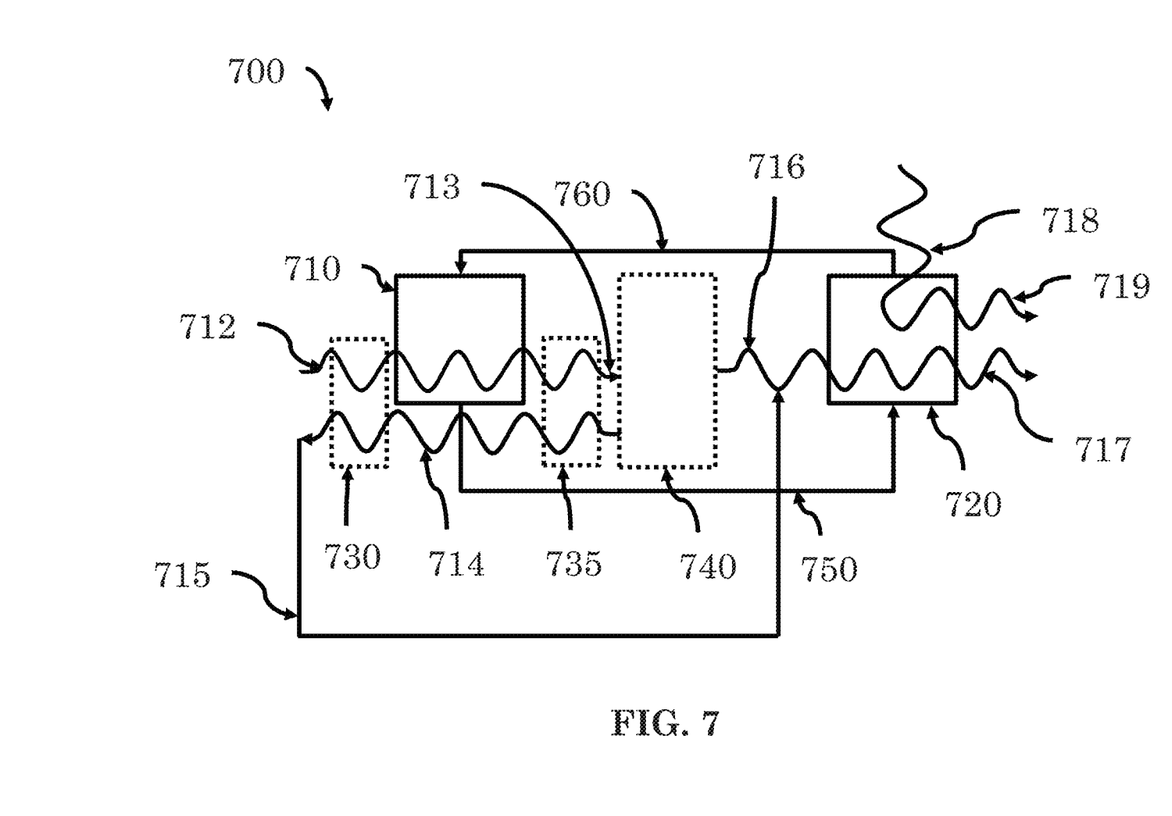

Referring now to FIG. 7, Humid Outside Air ("OA") (712) existing outside some volume of space (740), including but not limited to such spaces as rooms, buildings, or vehicles, passes through the absorber unit (710). The absorber unit (710) utilizes incoming "dry" desiccant (760) to draw moisture from the Humid OA (712), and then outputs the "wet" desiccant (750), as well as Dry Inside Air ("IA") (713). The Dry IA may optionally be passed back through one or more of a precool stage (730) and/or postcool stage (735), cooling the Humid OA. It should be noted that precooling drives RH up, which increases dehumidification, while postcooling removes sensible heat from the dehumidification. The Dry IA passing through these stages can be considered Dry IA Exhaust. It should be noted that other sources of cool air can also be incorporated here, which is limited but not limited to geothermal sources, radiant night sky, diurnal cool energy storage, and seasonal cool energy storage.

Dry IA (716) leaving the volume of space (740), and/or Dry IA Exhaust (715) may be heated and passed through the regeneration unit (720). In the regeneration unit (720), water from the "wet" desiccant (750) is desorbed into the air, the air becomes Humid IA Exhaust (717), and the "wet" desiccant becomes "dry" desiccant (760). It should be noted that waste heat is preferably utilized to minimize the energy requirements. It should also be noted that since the Humid IA Exhaust has been slightly heated via precool and/or postcool processing, slightly less energy is typically required when this approach is used. Humid OA (718) can also be passed through the regeneration unit, using more heat than is required when Dry IA (716) or Dry IA Exhaust (715) is utilized. As part of the regeneration process, the Humid OA (718) would become saturated or supersaturated Humid OA (719).

Thus, one method for mass and heat exchange involves moving a volume of a liquid desiccant having a first interaction potential with water through at least one liquid channel defined by a hydrophilic, non-porous membrane. A gas, such as air, is passed through a gas channel configured such that the air is in contact with at least one surface of the membrane. The membrane has an interaction potential with water that is less than the desiccant's interaction potential with water, but greater than the gas' interaction potential with water. Thus, from an energy perspective, the water will preferentially move from air to the membrane, and then from the membrane into the desiccant. In some embodiments, the gradient is further enhanced by reducing the partial pressure of water vapor in the air, and thereby increasing the concentration difference between the water in the membrane and water in air, typically by utilizing waste heat to heat the air stream, although any source of heat will suffice. In preferred embodiments, the waste heat is from sources such as, but not limited to, sunlight, combustion processes, building processes, or CPU heat emission.

Preferably, the liquid desiccant moves through a liquid channel until about the time when the channel enters a bulk diffusion-limited regime. The liquid channel then enters a mixing stage, and then on to one or more additional liquid channels, and the process is repeated as needed. In some embodiments, the air stream is also heated to lower the vapor pressure, thereby desorbing at least some water.

Although the invention has been described with reference to a particular embodiment, this description is not meant to be construed in a limiting sense. Various modifications of the disclosed embodiments as well as alternative embodiments of the invention will become apparent to persons skilled in the art. It is therefore contemplated that the appended claims will cover any such modifications or embodiments that fall within the scope of the invention.

What is claimed is:

1. A mass and heat exchange system, comprising:
   an absorber unit comprising:
      a plurality hydrophilic, non-porous membrane tubes having a first interaction potential with water;
      a liquid desiccant capable of flowing through the plurality of hydrophilic, non-porous membrane tubes, the liquid desiccant having a second interaction potential with water that is greater than the first interaction potential due to a partial pressure driving force;

at least one gas channel adapted for flowing a gas through the gas channel and contacting the gas with at least a portion of an outer surface of the hydrophilic, non-porous membrane tubes; and at least one mixing stage comprising a mixing chamber having at least one input port and at least one output port, configured such that an output from a first of the plurality hydrophilic, non-porous membrane tubes is operably connected to a first input port, and a first output port is operably connected to a second of the plurality of hydrophilic, non-porous membrane tubes.

2. The mass and heat exchange system of claim 1, the absorber unit further comprising at least one mixing stage, wherein the at least one mixing stage comprises:

a static mixing portion, defined by a region of the at least one hydrophilic, non-porous membrane tube comprising at least one baffle or at least one screw surface concentric with the axis of the hydrophilic, non-porous membrane tube.

3. The mass and heat exchange system of claim 2, wherein the absorber unit comprises a plurality of hydrophilic, non-porous membrane tubes, a plurality of gas channels, and a plurality of mixing stages.

4. The mass and heat exchange system of claim 1, wherein the liquid desiccant comprises an alkoxylated siloxane, and the hydrophilic, non-porous membrane comprises a polyether block amide block copolymer.

5. The mass and heat exchange system of claim 1, wherein a length of a first of the plurality of hydrophilic, non-porous membrane tubes is between 10 and 100,000 times longer than an inner diameter of the first of the plurality of hydrophilic, non-porous membrane tubes.

6. The mass and heat exchange system of claim 5, wherein an inner diameter of the at least one gas channel is between 2 and 15 times larger than the inner diameter of the first of the plurality of hydrophilic, non-porous membrane tubes.

7. The mass and heat exchange system of claim 1, wherein a length of a first of the plurality of hydrophilic, non-porous membrane tubes is less than 20 cm.

8. The mass and heat exchange system of claim 1, wherein the rate of absorption on a free surface of the liquid desiccant is slower than the rate of mass transfer of water through the hydrophilic, non-porous membrane tubes.

9. The mass and heat exchange system of claim 1, wherein the liquid desiccant is non-toxic and non-corrosive.

10. The mass and heat exchange system of claim 1, further comprising:

a regeneration unit, comprising an absorbing unit configured to flow relatively saturated desiccant through the liquid channels, and low vapor pressure air through the gas channels.

11. The mass and heat exchange system of claim 1, further comprising at least one temperature or relative humidity sensor positioned upstream or downstream from a gas channel.

12. The mass and heat exchange system of claim 1, further comprising at least one positive displacement pump.

13. A method of exchanging heat and mass, the method comprising the steps of:

flowing a volume of a liquid desiccant having a first interaction potential with water through at least one hydrophilic, non-porous membrane tube, each hydrophilic, non-porous membrane tube having a second interaction potential with water that is less than the first interaction potential; and flowing a gas having a first relative humidity through at least one gas channel such that the gas contacts at least a portion of an outer surface of the hydrophilic, non-porous membrane tube, and such that at least some water present in the gas transfers through the hydrophilic, non-porous membrane tube and into the liquid desiccant.

14. The method of claim 13, wherein the gas is flowed through the gas channel at a velocity such that the Reynolds number of the gas in the gas channel is greater than 200 and less than 2000.

15. The method of claim 13, further comprising flowing the liquid desiccant into a mixing stage after passing through the at least one liquid channel, and then flowing the liquid desiccant from the mixing stage through a second at least one liquid channel.

16. The method of claim 15, wherein a plurality of liquid channels flow liquid desiccant into the mixing stage and the liquid desiccant flows out of the chamber through a second plurality of liquid channels.

17. The method of claim 13, further comprising the steps of: increase the concentration difference of water in the air and in the desiccant.

18. The method of claim 17, wherein the partial pressure of water vapor in the air is reduced by utilizing waste heat to heat the air stream.

19. The method of claim 18, wherein the waste heat is from at least one of sunlight or building processes.

20. The method of claim 18, wherein the partial pressure of the supply air is increased using a supply of cool air.

* * * * *